United States Patent [19]

Liu

[11] Patent Number: 4,504,626
[45] Date of Patent: Mar. 12, 1985

[54] POLYCARBONATE RESIN MIXTURES

[75] Inventor: Ping Y. Liu, Naperville, Ill.

[73] Assignee: General Electric Company, Mt. Vernon, Ind.

[21] Appl. No.: 421,786

[22] Filed: Sep. 23, 1982

[51] Int. Cl.$^3$ .................. C08L 23/00; C08L 23/04; C08L 23/10; C08L 69/00
[52] U.S. Cl. .................................... 525/133; 525/146
[58] Field of Search ....................... 525/133, 1–18, 525/146

[56] References Cited

U.S. PATENT DOCUMENTS

| 313,431 | 3/1885 | Kuhn | 435/93 |
|---|---|---|---|
| 2,999,835 | 9/1961 | Goldberg | 260/42 |
| 3,028,365 | 4/1962 | Schnell et al. | 260/47 |
| 3,334,154 | 8/1967 | Kim | 260/860 |
| 3,431,224 | 3/1969 | Goldblum | 260/13 |
| 3,801,673 | 4/1974 | O'Connell | 260/873 |
| 4,001,184 | 1/1977 | Scott | 260/47 XA |
| 4,076,698 | 2/1978 | Anderson et al. | 260/40 R |
| 4,131,575 | 12/1978 | Adelmann et al. | 260/17.4 R |

FOREIGN PATENT DOCUMENTS

| 4645 | 10/1979 | European Pat. Off. . |
|---|---|---|
| 1182425 | 6/1959 | France . |
| 37792 | 3/1981 | Japan . |
| 38730 | 3/1981 | Japan . |

OTHER PUBLICATIONS

Heinert, D. H., Polycarbonate Blends With Improved Critical Thickness, Research Disclosure No. 20810, Aug. 1981, Dow Chemical Co.

*Primary Examiner*—Allan M. Lieberman
*Attorney, Agent, or Firm*—Martin B. Barancik

[57] ABSTRACT

Novel compositions with improved resistance to environmental stress cracking and crazing comprising
(a) an aromatic carbonate polymer; and
(b) a modifier combination therefor comprising
  (i) a thermoplastic olefin polymer insoluble therein; and
  (ii) a linear low density polyolefin.

9 Claims, No Drawings

POLYCARBONATE RESIN MIXTURES

BACKGROUND OF THE INVENTION

This invention relates to thermoplastic resin compositions and more particularly is concerned with polycarbonate resin mixtures having extraordinary resistance to environmental stress crazing and cracking.

Aromatic carbonate polymers are well known, commercially available materials having a variety of applications in the plastics art. Such carbonate polymers may be prepared by reacting a dihydric phenol, such as 2,2-bis(4-hydroxyphenyl)-propane, with a carbonate precursor, such as phosgene, in the presence of an acid binding agent. Generally speaking, aromatic polycarbonate resins offer a high resistance to the attack of mineral acids, may be readily molded, and are physiologically harmless as well as stain resistant. In addition, such polymers have a high tensile and impact strength (except in thick molded sections), and a dimensional stability surpassing that of other thermoplastic materials. However, in certain applications, the use of aromatic polycarbonate resins is limited because they exhibit severe environmental stress crazing and cracking. "Environmental stress crazing and cracking" refers to the type of failure which is hastened by the presence of organic solvents such as, for example, gasoline, acetone, heptane and carbon tetrachloride when such solvents are in contact with stressed parts fabricated from aromatic polycarbonate resins. The most significant effect is a loss in impact strength and also an increase in brittle type failure. Contact with such solvents may occur, for example, when parts are used under the hood of automobiles, or near the gasoline filler ports thereof, or when solvents are used to clean or degrease stressed parts made from polycarbonate resins.

At present, no entirely satisfactory means is available for reducing environmental stress crazing and cracking of polycarbonate resins, although a variety of methods have been proposed.

In Goldblum, U.S. Pat. No. 3,431,224, assigned to the same assignee as this application, for example, it is proposed to add modifiers to polycarbonate, in certain proportions, the modifiers comprising at least one member of the class consisting of polyethylene, polypropylene, polyisobutylene, a copolymer of ethylene and an ethyl acrylate, a copolymer of ethylene and propylene, a cellulose ester, a polyamide, a polyvinyl acetal, an alkyl cellulose ether, and a polyurethane elastomer. While the results with such modifiers are generally excellent, in thin sections, e.g., ⅛ inch, it has been found, as will be shown later herein, that the weld line strength is significantly improved by the compositions of this invention.

Another modifier proposed to be added to polycarbonate is reported in Research Disclosure No. 20810, Dow Chemical Company, August 1981. Data are provided showing that polycarbonates modified with a linear low density polyolefin, namely, ethylene/octene-1 copolymer, provide good impact strength at increased part thickness. There is no suggestion therein that such a modifier will enhance resistance to environmental stress crazing and cracking, and, as will be shown hereinafter, soaking a composition modified with a linear low density copolymer of ethylene and butene-1, even in thin sections, causes the impact strength to deteriorate substantially and results in brittle failure. Still other modifiers have been proposed for impact strength improvement, but none of them provides optimum environmental stress crazing and cracking resistance—applicant's earlier filed commonly assigned U.S. patent applications, Ser. No. 313,431, filed Oct. 21, 1981, being expressly mentioned in this connection. Ser. No. 313,431, describes polycarbonates modified with a linear low density polyolefin (LLDPE), e.g., a copolymer of ethylene and a small amount of butene-1. Such compositions process well and are toughened, but there is no disclosure of solvent resistance and, as will be shown later herein, the LLDPE's alone do not provide enhanced resistance to environmental stress crazing and cracking, even in thin sections.

SUMMARY OF THE INVENTION

Unexpectedly, in view of the foregoing, it has now been discovered that polycarbonate resins (a) may be rendered more resistant to environmental stress crazing and cracking by incorporating therewith, in certain proportions, a modifier combination comprising (b)(i), a thermoplastic olefin polymer insoluble in the said polycarbonate and (b)(ii) a linear low density polyolefin.

When the above-mentioned modifier combination is added to the polycarbonate resin, within a certain range, the resultant mixture possesses a resistance to environmental stress crazing and cracking greater than that possessed by the polycarbonate resin itself. This result is entirely unexpected because the prior art would indicate that high crystallinity is necessary for solvent resistance whereas and, in fact, partially crystalline modifiers are employed herein, as component (b)(ii), reducing crystallinity but inducing solvent resistance.

DESCRIPTION OF THE INVENTION

In accordance with the invention there are provided resin admixtures comprising
  (a) an aromatic polycarbonate resin; and
  (b) a modifier combination therefor comprising
    (i) a thermoplastic olefin polymer insoluble in the said polycarbonate resin; and
    (ii) a linear low density polyolefin resin, said modifier being present in an amount sufficient to impart to said mixture a resistance to environmental stress crazing and cracking greater than that possessed by said polycarbonate resin alone, and enhanced weld line strength compared to polycarbonate resin plus (b)(i).

The amounts of modifier combination to be employed vary broadly but, in general, best results will be obtained when the modifier is added to the polycarbonate resin in amounts ranging from about 4 parts to about 50 parts by weight per 100 parts by weight of the polycarbonate resin and the modifier. When less than 4.0 parts are used, the improvement in the craze resistance of the polycarbonate is not readily detectable and, where the amount exceeds about 50 parts, the mixture begins to lose the beneficial properties of the polycarbonate. Preferably, the modifier is added in amounts ranging from about 5.0 to 15 parts per hundred of combined (a) and (b). Such addition may be accomplished in any manner so long as a thorough distribution of the modifier in the polycarbonate resin is obtained. For example, the mixing of materials may be accomplished by a variety of methods normally employed for incorporation of plasticizers or fillers into thermoplastic polymers including but not limited to mixing rolls, doughmixers, Banbury mixers, extruders, and other mixing equipment. The resulting mixtures may be handled in any conventional manner employed for the fabrication or manipulation of thermoplastic resins. The materials may be formed or molded using compression, injection, calendering, extrusion, blow molding, etc. techniques, alone, or in any combination. Also, multiforming methods such as extrusion-blow molding, or co-extrusion-coinjection can be used, e.g., for multi-layer containers. It should be understood that the polycarbonate resin mixtures prepared in accordance with the invention may also contain, in addition to the above-mentioned polymers, other additives to lubricate, reinforce, prevent oxidation, or lend color to the material. Such additives are well known in the art, and may be incorporated without departing from the scope of the invention.

The fact that the addition of the combination of components specified above to a polycarbonate resin system provides a resinous mixture having an improved resistance to environmental stress crazing and cracking with respect to polycarbonate and enhanced weld line strength compared to polycarbonate resin plus (b)(i) is totally unexpected and not fully understood.

The aromatic carbonate polymers (a) used to provide polycarbonate mixtures of the present invention may be prepared by reacting a dihydric phenol with a carbonate precursor such as phosgene, a haloformate or a carbonate ester. Generally speaking, such carbonate polymers may be typified as possessing recurring structural units of the formula:

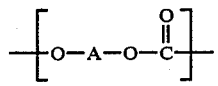

where A is a divalent aromatic radical of the dihydric phenol employed in the polymer producing reaction. Preferably, the carbonate polymers used to provide the resinous mixtures of the invention have an intrinsic viscosity (as measured in methylene chloride in deciliters per gram at 25° C.) ranging from about 0.30 to about 1.0. The dihydric phenols which may be employed to provide such aromatic carbonate polymers are mononuclear or polynuclear aromatic compounds, containing as functional groups, two hydroxy radicals, each of which is attached directly to a carbon atom of an aromatic nucleus. Typical dihydric phenols are
2,2-bis-(4-hydroxyphenyl)propane;
hydroquinone;
resorcinol;
2,2-bis-(4-hydroxyphenyl)pentane;
2,4'-(dihydroxydiphenyl)methane;
bis-(2-hydroxyphenyl)methane;
bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane;
2,2-dihydroxydiphenyl;
2,6-dihydroxynaphthalene;
bis-(4-hydroxydiphenyl)sulfone;
bis-(3,5-ethyl-4-hydroxyphenyl)sulfone;
2,2-bis-(3,5-dimethyl-4-hydroxyphenyl)propane;
2,4'-dihydroxydiphenyl sulfone;
5'-chloro-2,4'-dihydroxydiphenyl sulfone;
bis-(4-hydroxyphenyl)diphenyl sulfone;
4,4'-dihydroxydiphenyl ether;
4,4'-dihydroxy-3,3'-dichlorodiphenyl ether;
4,4'-dihydroxy-2,5-dihydroxydiphenyl ether;
and the like.

A variety of additional dihydric phenols which may be employed to provide such carbonate polymers are disclosed in commonly assigned Goldberg, U.S. Pat. No. 2,999,835. It is, of course, possible to employ two or more different dihydric phenols or a dihydric phenol in combination with a glycol, a hydroxy terminated polyester, or a dibasic acid in the event that a carbonate copolymer rather than a homopolymer is desired for use in the preparation of the polycarbonate mixtures of the invention. Branched polycarbonates are also useful. To avoid unnecessarily detailed description, the disclosures of U.S. Pat. Nos. 3,028,365; 3,334,154; 4,001,184; 4,131,575 are incorporated herein by reference. In any event, the preferred aromatic carbonate polymer is a homopolymer derived from 2,2-bis(4-hydroxyphenyl)propane (bisphenol A).

Generally speaking, the modifier combination components (b)(i) and (b)(ii) which are admixed with polycarbonate resins to provide the resin mixtures of the invention are themselves well known commercially available thermoplastic resin materials.

Thermoplastic polyolefin resin component (b)(i) will comprise a polymer of ethylene, propylene, ethyleneethyl acrylate copolymer, ethylene propylene copolymer and other copolymers of ethylene with monomers polymerizable with ethylene. The polymers are to be insoluable in polycarbonate. By "insoluble" is meant at least essentially insoluble in polycarbonate at ordinary temperature. It is desirable but not essential that they have a melt viscosity within 50 percent of that of the polycarbonate selected at the melt blending temperature and shear rate employed in mixing. In any case, where ethylene is copolymerized with an alpha-olefin, component (b)(i) will be distinguishable from component (b)(ii) because the former may have random and side chain branching, and the latter will be predominantly linear with controlled side chains links. Especially preferred for component (b)(i) are polyethylene, polypropylene, polyisobutylene, a copolymer of ethylene and ethyl acrylate, a copolymer of ethylene and propylene and mixtures of any of the foregoing. Especially preferred is polypropylene, which is readily available from a number of commercial sources.

Linear low density polyolefin component (b)(ii) may be prepared by state-of-the-art polymerization processes such as those described in U.S. Pat. No. 4,076,698 and Eur. Pat. Appl. No. 4,645, both of which are incorporated by reference. The polymer may have a density between 0.89 and 0.96 g./cc. and a controlled concentration of simple side chain branching which distinguishes it from polymers such as high pressure low density polyethylene and high density polyethylene. The preferred range of density is 0.915 to 0.945 g./cu. The linear low density polymers preferably are made from ethylene and an alpha olefin of $C_3$ to $C_8$ carbon content, e.g., butene-1 and octene-1, or mixtures of such alpha-olefins. The comonomer is used in a minor amount, e.g., 10 mol% or less of the total amount of monomers. A preferred range is 1-3 mol%. The preferred copolymer is a copolymer made from ethylene and butene-1 such as Escorene®LPX-15 of Exxon, Houston, Tex.

Within the broad composition ranges specified above, the following have been found to provide desirable properties for the mixtures: polycarbonate component (a) comprises from about 84 to about 96 parts by weight; polyolefin component (b)(i) comprises from about 2 to about 8 parts by weight; and linear low density polyolefin component (b)(ii) comprises from about 2 to about 8 parts by weight, per 100 parts by weight of components (a), (b)(i) and (b)(ii) combined.

The resistance to environmental stress crazing and cracking of the polycarbonate resin mixtures prepared in accordance with the invention was determined by subjecting stressed specimens to gasoline soaking and then measuring their impact strengths with special attention to the mode of failure, ductile failure being preferable. The specimens were ASTM D 256 impact test bars of two sizes: 2½×½"×⅛" and 2½×½"×¼". Values of the desired stress were applied to each test bar by mounting on an ASTM stress jig at 0.3 percent strain. The mounted bars were soaked 4 hours at room temperature in AMOCO ® unleaded premium grade gasoline. They were then removed from the jig, the gasoline evaporated and the bars dried for 24 hours. Izod impact strengths were then determined according to ASTM D 256 procedures on notched specimens. In all cases, the properties are compared with those of identical unsoaked, molded mixtures. Those which retain a substantial amount of impact resistance after soaking obviously are the best at resisting environmental stress cracking. Additionally, the weld line strength of the compositions was measured with specimens prepared in a double gate mold and tested according to ASTM D 256.

DESCRIPTION OF THE PREFERRED EMBODIMENTS

In order that those skilled in the art may better understand how the present invention may be practiced, the following examples are given by way of illustration and not by way of limitation. All parts and percentages are by weight unless otherwise noted. The various polycarbonate resin mixtures were molded into the test specimens in a 3 oz. Van Dorn injection molding machine. The temperatures used were 275° C. on the cylinder and nozzle with a range of from 265° C. to 282° C.

EXAMPLES 1-3

An aromatic polycarbonate derived from 2,2-bis(4-hydroxyphenyl)propane and having an intrinsic viscosity (i.v.) in the range of from about 0.46 to about 0.49 dl/g as determined in methylene chloride solution at 25° C. was mixed with polypropylene (Escorene PP1012) and a linear low density polyolefin resin which is a copolymer of ethylene and butene-1 (Escorene ®LPX-15). The ingredients were then blended together by mechanically mixing them in a laboratory tumbler and the resulting mixture was fed to an extruder which was operated at about 255° C. The resulting extrudates were comminuted into pellets. The pellets were injection molded at 265° C. to 282° C. into test specimens of about 2½ by ½" by ¼" and 2½ by ½" by ⅛", the latter dimension being specimen thickness. Some of the specimens were mounted on an ASTM stress jig at 0.3% strain and soaked in AMOCO ® premium unleaded gasoline for 4 hours, removed from the jig, the gasoline allowed to evaporate and dry at room temperature for 24 hours. Where indicated, Izod impact strengths of these specimens were measured according to the notched Izod test, ASTM D 256, and are set forth in Table 1. The weld line strength was determined as previously mentioned. The superscript refers to the percent ductility at the foot lb. value. The samples labeled control were the bisphenol A polycarbonate, unmodified, or modified as indicated. The formulations used, and the results obtained are set forth in Table I:

TABLE I

POLYCARBONATE MODIFIED WITH A POLYOLEFIN AND A LINEAR LOW DENSITY POLYOLEFIN

| | EXAMPLE | | | | | |
|---|---|---|---|---|---|---|
| | A* | B* | C* | 1 | 2 | 3 |
| Composition (pbw) | | | | | | |
| polycarbonate | 100 | 90 | 90 | 91 | 92 | 91 |
| polypropylene | — | 10 | — | 6 | 4 | 3 |
| linear low density polyethylene | — | — | 10 | 3 | 4 | 6 |
| PROPERTIES: | | | | | | |
| Notched Impact Strength | | | | | | |
| ⅛" ft. lbs.-in. | 14.8** | 10.7 | 12.4 | 12.0 | 12.7 | 12.0 |
| ¼" ft. lbs.-in. | 1.6* | 7.9 | 8.8 | 8.2 | 8.7 | 7.8 |
| Weld line strength | >4.0 | 4.7$^H$ | 4.3$^H$ | 5.4$^{20}$ | 6.6$^{40}$ | 6.7 |
| SOAKED IN GASOLINE | | | | | | |
| Notched Impact Strength ⅛" ft. lbs.-in. | 6.6* | 10.5 | 0.9* | 12.0 | 12.5 | 12.0 |

*Control
**Unless otherwise specified, all were ductile at failure.

The results demonstrate that the impact strengths of the new compositions of Examples 1 through 3 were retained in comparison with the controls in the ⅛" samples and that impact strengths in the ¼" samples are substantially improved over the polycarbonate alone controls. Furthermore, after soaking in gasoline, the invention Examples show a retention of strength and desirable ductile failure mode. The weld line strengths of the invention Examples are significantly higher then either polycarbonate with polypropylene or polycarbonate with linear low density polyethylene at comparable total quantities. It is also interesting to note that although polycarbonate with linear low density polyethylene loses significant impact resistance at ⅛" when soaked in gasoline, the invention Examples show complete retention of impact resistance when significant quantities of linear low density polyethylene are incorporated therein.

The above-mentioned patents, applications, and publications are incorporated herein by reference. Obviously, many variations will suggest themselves to those skilled in this art in light of the detailed description herein. For example, instead of a bisphenol-A polycarbonate, one containing units derived from tetramethylbisphenol-A or from dixylenol sulfone can be used. Instead of polypropylene, a copolymer of ethylene and propylene can be used. Instead of a linear low density polyethylene comprising units of ethylene and butene-1, there can be substituted one comprising units of ethylene and octene-1. The compositions can be provided in reinforced modifications, e.g., those reinforced with chopped glass filaments, or in flame retardant modifications. All such obvious variations are within the full intended scope of the appended claims.

I claim:
1. A resin mixture comprising
  (a) an aromatic polycarbonate resin, and
  (b) a modifier combination therefor comprising
    (i) a thermoplastic olefin polymer insoluble in said polycarbonate resin excluding a linear low density polyolefin; and

(ii) a linear low density polyolefin resin,
said modifier being present in an amount sufficient to impart to said mixture a resistance to environmental stress crazing and cracking greater than that possessed by said polycarbonate resin (a) alone, and enhanced weld line strength compared to polycarbonate resin plus (b)(i) wherein said component (a) comprises from 84 to about 96 parts by weight, component (b)(i) comprises from about 2 to about 8 parts by weight and component (b)(ii) comprises from about 2 to about 8 parts by weight, per 100 parts by weight of components (a), (b)(i) and (b)(ii) combined.

2. A resin mixture as defined in claim 1 wherein the amount of modifier combination (b) ranges from about 4 to about 50 parts by weight per 100 parts by weight of resin (a) and modifier combination (b) together.

3. A resin mixture as defined in claim 1 wherein the aromatic carbonate polymer comprises recurring structural units of the formula:

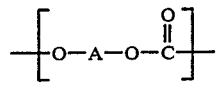

wherein A is a divalent aromatic radical of a dihydric phenol.

4. A resin mixture as defined in claim 3 wherein in said formula, A is derived from a 4,4'-dihydroxy-di(-mononuclear aryl)alkane.

5. A resin mixture as defined in claim 1 wherein said aromatic polycarbonate (a) comprises poly(2,2-diphenylpropane)carbonate.

6. A resin mixture as defined in claim 1 wherein said thermoplastic olefin polymer (b)(i) comprises at least one member selected from the class consisting of polyethylene, polypropylene, polyisobutylene, a copolymer of ethylene and ethyl acrylate and a copolymer of ethylene and propylene.

7. A resin mixture as defined in claim 6 wherein said thermoplastic olefin polymer (b)(i) comprises polymerized propylene units.

8. A resin mixture as defined in claim 1 wherein said linear low density polyolefin resin (b)(ii) is a linear low density polyethylene resin.

9. A resin mixture as defined in claim 8 wherein said linear low density polyolefin resin is a copolymer of ethylene and butene-1.

* * * * *